United States Patent [19]

Kaufman

[11] Patent Number: 5,590,817
[45] Date of Patent: Jan. 7, 1997

[54] DISPENSER WITH FLOW CONTROL

[76] Inventor: John G. Kaufman, 858 Condor Drive, Burlington, Ontario, Canada, L7T 3A7

[21] Appl. No.: 555,946

[22] Filed: Nov. 13, 1995

Related U.S. Application Data

[63] Continuation-in-part of Ser. No. 339,170, Nov. 10, 1994, abandoned.

[51] Int. Cl.[6] .................................................. B65D 37/00
[52] U.S. Cl. ........................ 222/185.1; 222/207; 222/212
[58] Field of Search ............................. 222/185.1, 207, 222/184, 209, 212, 424.5, 491, 494, 481.5

[56] References Cited

U.S. PATENT DOCUMENTS

| | | | |
|---|---|---|---|
| 3,157,319 | 10/1962 | Schwienbacher | 222/207 |
| 4,324,349 | 4/1982 | Kaufman | 222/207 |
| 4,516,697 | 5/1985 | Dreps et al. | 222/212 |
| 4,635,828 | 1/1987 | Kaufman | 222/185.1 |
| 4,645,097 | 2/1987 | Kaufman | 222/207 |
| 4,930,668 | 6/1990 | Krall | 222/212 |
| 5,033,653 | 7/1991 | Kaufman | 222/185.1 |
| 5,060,830 | 10/1991 | Krall | 222/212 |
| 5,217,147 | 6/1993 | Kaufman | 222/185.1 |

FOREIGN PATENT DOCUMENTS

94/01032  1/1994  WIPO .

*Primary Examiner*—Andres Kashnikow
*Assistant Examiner*—Philippe Derakshani
*Attorney, Agent, or Firm*—Rogers & Scott

[57] ABSTRACT

Dispensers are provided of the type which include a flow path through which liquid must pass to leave the dispenser. After the dispenser has been actuated to dispense, the flow path then receives reverse flow as the dispenser recovers ready for the next dispensing. This reverse flow limits the possibility of dripping from the dispensing outlet. A flow controller in the flow path automatically adjusts to have little or no interference to the flow of liquid leaving the dispenser and then positions itself to slow down the rate of reverse flow into the dispenser. The dispenser is suitable for more viscous liquids.

15 Claims, 3 Drawing Sheets

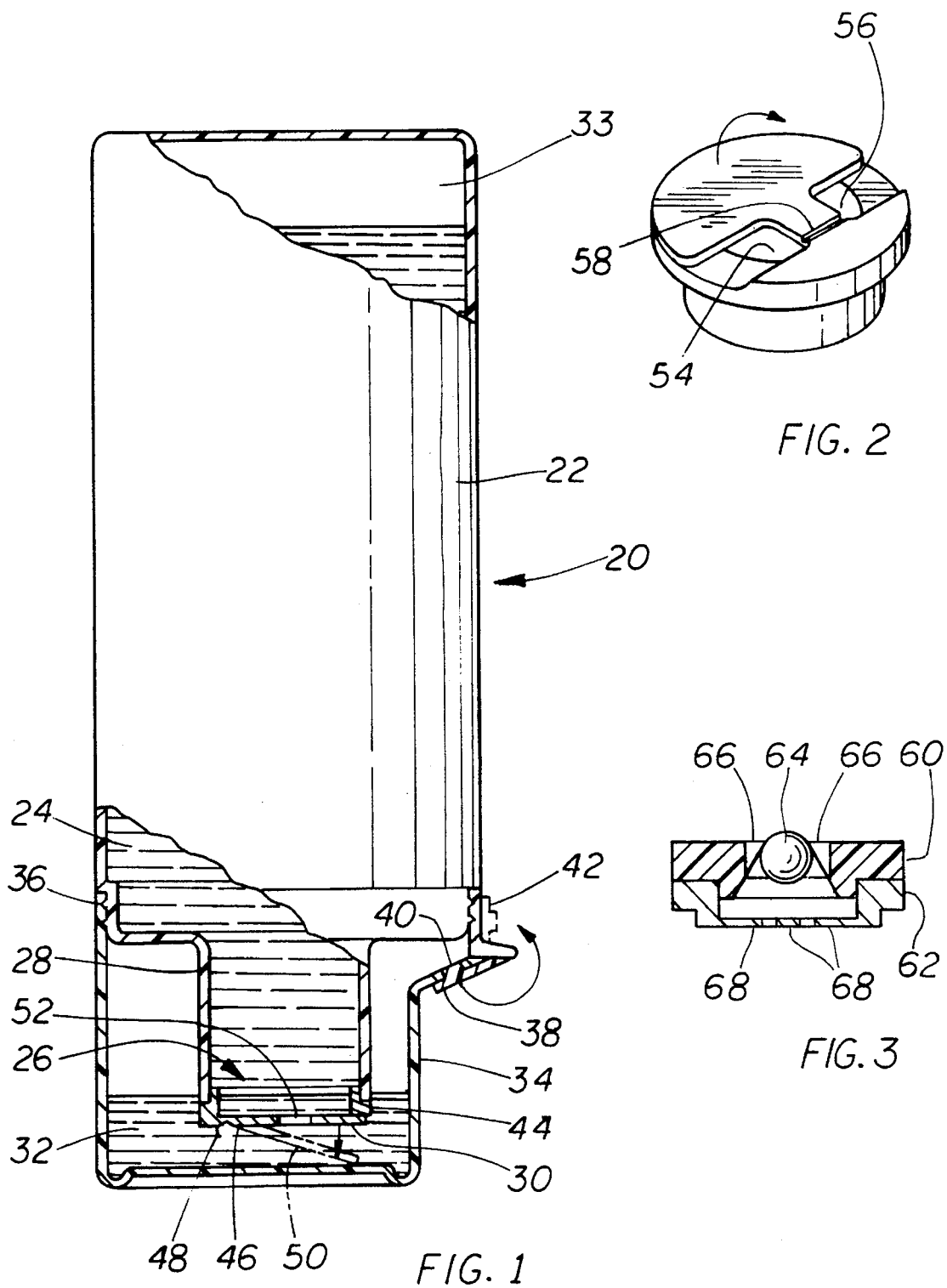

DISPENSER WITH FLOW CONTROL

RELATED APPLICATION

This application is a continuation-in-part of previously filed U.S. application Ser. No. 08/339,170 filed on Nov. 10, 1994 now abandoned.

FIELD OF THE INVENTION

This invention relates to dispensers for liquids and more particularly to dispensers capable of storing and dispensing medium to higher viscosity products such as shampoo, hand soap and the like.

BACKGROUND OF THE INVENTION

Dispensers have been developed which consist of an inverted container for receiving the liquid and having a bottom outlet positioned inside a reservoir. A pool of the liquid accumulates under atmospheric pressure in the reservoir around the bottom outlet to thereby trap the liquid in the container with a negative pressure above the liquid. Various structures have been provided to disturb the balance of the liquid and the negative pressure in the container to thereby cause controlled flow from the dispenser through an outlet associated with the reservoir and then, after dispensing to cause suck-back to clear liquid from the dispensing outlet. Such dispensers can be seen in applicant's prior patents, namely U.S. Pat. Nos. 4,324,349, 4,635,828, 4,645,097, 5,033,653, and 5,217,147.

The principles of operation of the dispensers are described in some detail in U.S. Pat. No. 5,033,653 which includes diagrams illustrating the conflicting parameters associated with providing temperature compensation. As demonstrated in that patent, the liquid must not flow from the dispenser when temperature rises, and yet the dispenser must have a response rate which will allow the user to dispense almost instantaneously upon applying a force to the dispenser. U.S. Pat. No. 5,033,653 also provides structures which overcome these disadvantages satisfactorily by separating the two parameters so that response rate will not be so dependent on the amount of temperature compensation provided in the structure. However it has been found that when liquids of higher viscosities are used, there is a disadvantage in all of the prior structures which was not apparent earlier. It has now been found that when the dispenser recovers from dispensing by receiving air from outside, instead of liquid returning into the container from the reservoir, air will tunnel directly through the viscous liquid and find its way into the container. This results in excessive build up of liquid in the reservoir and eventual dripping and improper dispensing.

A second cause of the same difficulty results from the rate of recovery of the dispenser after squeezing the container to dispense. The initial force driving the recovery rate is greatest when the container is at its maximum deflection where the most energy is available to drive the recovery. As a result, air will initially be inspired into the dispenser at a high rate and this will cause the air to tunnel through the liquid and into the container.

These disadvantages are exacerbated in smaller structures such as those used to contain hand soap or shampoo. Inherently with these structures the distances and dimensions are such that both of these disadvantages take place at the same time.

It has now been found that different approaches to the relationship between temperature compensation and response rate have to be considered if higher viscosity liquids are to be dispensed, particularly from small dispensers.

SUMMARY OF THE INVENTION

Dispensers of the present type include a flow path through which liquid must pass as it travels outwardly to leave the dispenser. After the dispenser is actuated to dispense, liquid remaining in the flow path tends to be sucked back into the dispenser causing inward or reverse flow as the dispenser recovers ready for the next dispensing. This is an inherent and desirable part of dispensers of the present type because this reverse flow limits the possibility of dripping from the dispensing outlet. The present invention places a flow controller in the flow path which automatically adjusts to have little or no interference with the flow of liquid leaving the dispenser and then positions itself to slow down the rate of reverse flow into the dispenser. This slowing down of the rate ensures that the energy which would otherwise be available for sudden recovery, is available to drive the viscous liquid through a restricted path. Consequently during recovery, liquid is cleared from the outlet portion of the dispenser, relatively slowly before air meets the flow controller. At this point there is less energy available because the dispenser has recovered to some extent. Also, the procedure ensures that the liquid level in the reservoir has an opportunity to drop as liquid is drawn from the reservoir into the container and this minimizes the risk that the liquid will build up in the reservoir and make the dispenser inoperable.

BRIEF DESCRIPTION OF THE DRAWINGS

FIG. 1 is a side view, partly in section, of a preferred embodiment of a dispenser according to the invention;

FIGS. 2 and 3 illustrate exemplary forms of flow controller which could be used in the embodiment, the flow controllers being drawn to a larger scale than the scale used in FIG. 1;

Figure 4:
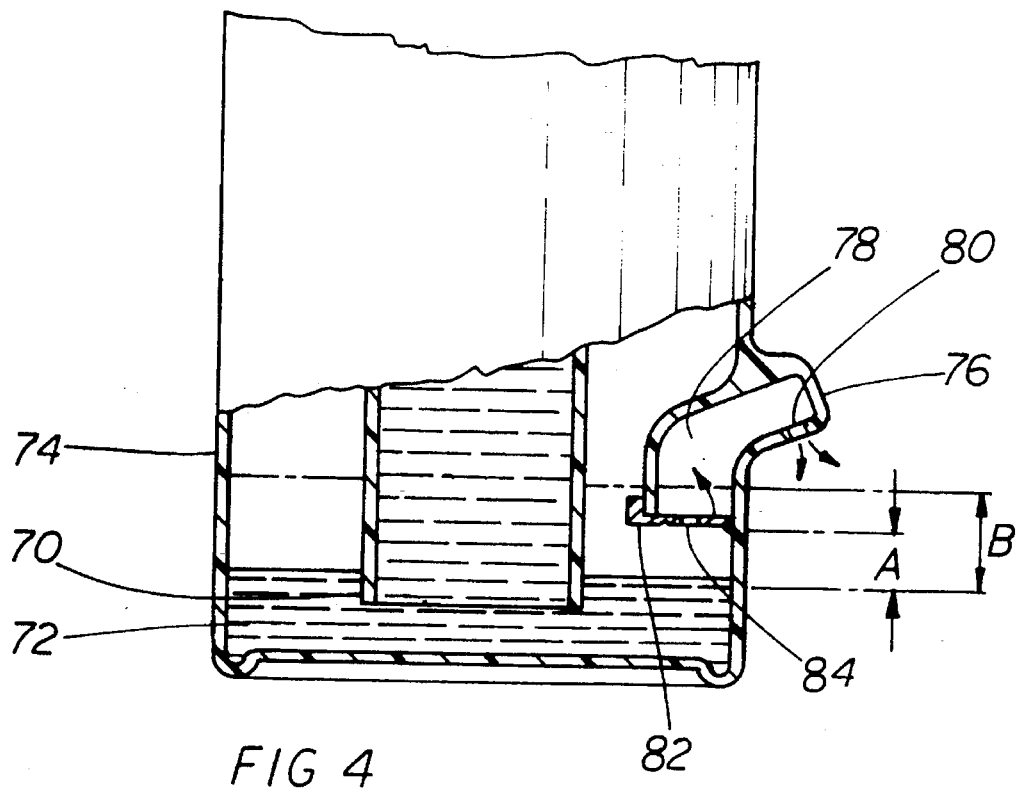
FIG. 4 is a view similar to FIG. 1 of part of a second embodiment of the dispenser.

Reference is first made to FIG. 1 which shows an exemplary dispenser 20 according to one of the preferred embodiments of the invention. The dispenser includes a resilient, deformable container 22 holding a supply of liquid 24 and having an inverted bottom outlet 26 in a neck 28. At the bottom of the outlet a flow controller 30 is immersed in a pool of liquid 32 which maintains a zone 33 of negative pressure above the liquid 24. The pool is contained in an outlet structure 31 having a reservoir 34 which is attached by threaded engagement 36 to a suitably formed portion of the container 22. A pivoted closure element 38 (shown in a closed position) blocks a discharge opening 40 and can be moved into an open position 42 (shown in ghost outline) for storage when the dispenser is in use.

The operation of the dispenser is similar to that described in the aforementioned patents. The negative pressure in the zone 33 above the liquid 24 retains the column of liquid in the container because the liquid can not inspire air to displace the liquid due to the fact that the neck 28 of the container meets the pool of liquid 32 in the reservoir 34. However if the user changes this balance, then liquid can be made to leave the dispenser. This is conveniently done by making the container 22 sufficiently flexible and resilient that the user can squeeze it thereby changing the pressure balance and causing liquid to flow downwardly past the flow controller 30 (which will be described later) and into the reservoir. The level in the reservoir will rise until such time as the level meets the discharge opening 40 and the liquid will leave the dispenser. At this point the container 22 is sufficiently deformed that significant energy has been stored in the container to return it to its original shape. This energy can be brought into play simply by releasing the container whereupon the container will suck back liquid from the reservoir 34 and at the same time inspire air into discharge opening 40 thereby clearing the opening and allowing the contents of the dispenser to return to the position shown in FIG. 1.

The arrangement also provides space for volumetric change of the zone 33 caused by ambient temperature fluctuations.

If an increase in temperature causes the level of the pool of liquid 32 to rise, there is adequate space in the reservoir to minimize the risk that the liquid will rise and escape through discharge opening 40. Also, as will be described, suck back after discharge will tend to return the liquid in the reservoir to the level shown in FIG. 1.

As previously mentioned, a disadvantage that has been found with liquids having higher viscosities is that the suck back does not quite happen in that order. What effectively happens is that because air can move more readily than the viscous liquid, air will enter the discharge opening 40 and proceed through the liquid towards the opening 26 at the end of the neck of the bottle. At this point in time the reservoir 34 is full of liquid so that if the air gets to the container 22 first, it will rise to the zone 33 above the liquid in the container before liquid can be purged from the reservoir 34. As a result when the pressures are equalized, the level of liquid in the reservoir is higher than it was originally. If this process continues, the level will be almost at the opening 40 and there will be no temperature compensation.

The flow controller 30 is added to the main structure to minimize the likelihood of air tunnelling through the liquid. The flow controller shown in FIG. 1 consists of an anchor ring 44 which is a push fit inside the bottle neck. Attached to the anchor ring to the left of FIG. 1 is a flap 46 connected at a living hinge 48. There is minimal strength in the hinge so that as a result, under normal circumstances the flap will tend to fall into a first condition or open position 50 (shown in ghost outline). In this position the flow controller offers minimal resistance to flow out of the container, and through the reservoir to the discharge opening 40. On the other hand, as soon as the user stops dispensing, the energy stored in the walls of the container 22 will be at a maximum and provide maximum force to draw liquid and air back into the container 22. Because the flow is reversed, the flap will automatically take up a second condition or closed position shown in FIG. 1 and the only access to the container is then through a central opening 52 in the flap.

As a result, the pressure drop across the opening 52 in the controller is such that the energy available to draw air into the container through the discharge opening 40 is reduced. The rate of flow is therefore reduced relative to the natural flow without the flow controller and the air has little chance to drive its way through the liquid. Consequently the level of liquid in the reservoir 34 will drop slowly as liquid is drawn through the opening 52 in the flow controller flap 46. This will result in the pool of liquid 32 in the dispenser returning essentially to the position shown in FIG. 1 where it was before dispensing took place. Of course the level of liquid in the container 22 will have dropped.

In general the flow controller 30 is lying in a flow path through which liquid must flow as it travels from the container and passes through the reservoir and issues through the discharge opening. The effect of this is an increase in the resistance to liquid flow when the flow is reversed.

FIG. 2 illustrates an alternative form of flow controller which differs only in that instead of having a central opening 52, the flap is waisted to define access openings 54, 56 to either side of a short living hinge 58.

Other forms of flow controller can be used such as that shown in FIG. 3. In this case the flow controller is illustrated in sections and is made up of first and second parts 60, 62 which are located and attached to one another to contain a free ball 64 (shown in the reverse flow position). The part 60 defines a conical opening which closes upwardly and terminates in several radial ribs 66 defining between the ribs space for flow past the ball. The second (or lower part 62) has four radial fingers 68 (three of which can be seen) which support the ball and provide minimal resistance to flow during discharge. When the flow is reversed, the ball rises into the position shown in FIG. 3 and flow then takes place around the ball and between the radial ribs 66.

As mentioned with reference to FIG. 1, the flow controller lies in a flow path. This flow path will vary in form depending upon the type of structure in use. For instance in FIG. 4, a neck 70 ends in a pool 72 of liquid in a reservoir 74. A discharge structure 76 forms part of the reservoir and defines an upwardly extending tube 78 which terminates at a discharge opening 80. At the bottom of the tube, a flow controller 82 is provided having a flap 84 somewhat like the flap described with reference to FIG. 1.

The structure shown in FIG. 4 allows for temperature compensation because the level of liquid in the reservoir can rise freely through a vertical distance indicated by "A" and after that, air will be trapped in the reservoir and further increase in pressure will tend to cause the liquid to rise through the tube 78 towards the discharge opening 80. The amount of temperature compensation can be varied by changing the height "A".

When a user discharges the dispenser, the liquid will rise through a distance "B" because there will be a certain amount of compression of air in the reservoir. Once this compression is complete, all of the energy subsequently applied forces liquid to flow past the flow controller and out through the discharge opening 80.

Once the discharge is complete, the reverse flow will be restricted by the flow controller so that there will be a tendency for the liquid in the reservoir to enter the container at least initially and then, as that level drops below the height indicated by "A" the air will come into the reservoir above the level of liquid. Consequently air can no longer tunnel through the liquid but simply apply a pressure to the complete surface of the liquid to push it back into the container. In this case, the flow path is from the container through the reservoir and then through the tube 78 and out through the discharge opening 80.

Figure 5:
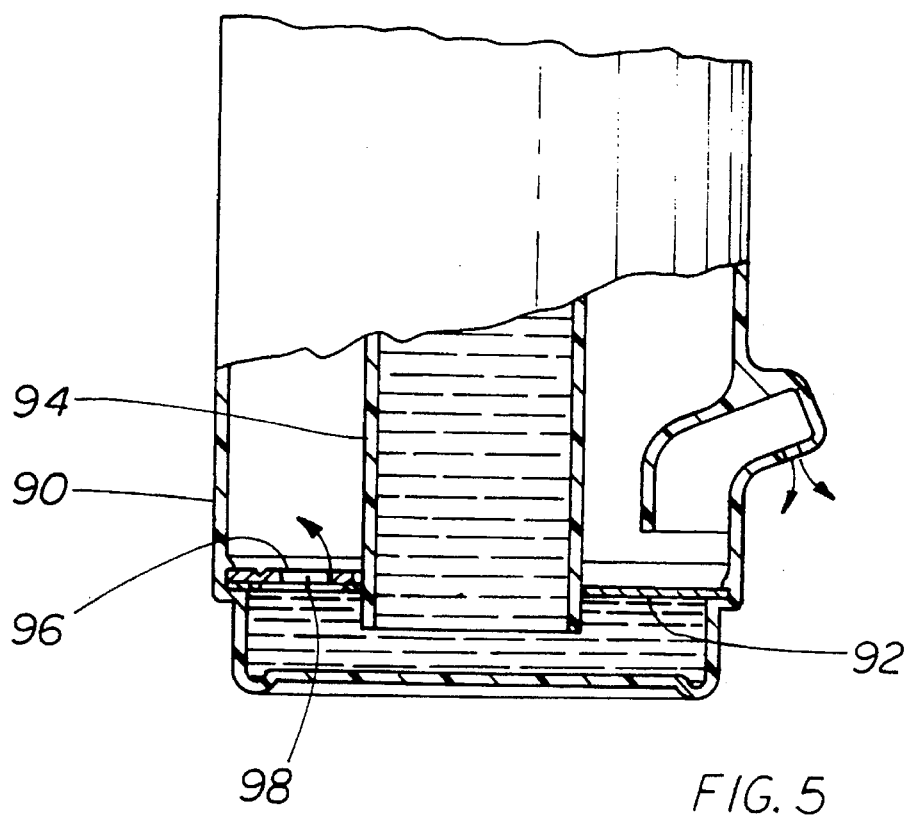
FIGS. 5 and 6 are views similar to FIG. 4 of further embodiments of the dispenser.

Reference is next made to FIG. 5 which is very similar to FIG. 4 except that the flow controller is placed in a different position in the flow path. In this case, a reservoir 90 is shaped to locate a disk 92 which engages about a container neck 94 to essentially close off the reservoir annularly about the neck 94. In at least one location on the disk, a flap 96 is attached to create a flow controller at that location. The flap will open upwardly when discharge takes place to offer minimal resistance to flow and then, the flap will drop back to the position shown in FIG. 5 where the only flow will be through a central opening 98 thereby restricting the flow and ensuring that air coming into the dispenser will not tunnel through the liquid. In fact the air will end up above the liquid applying a pressure on the surface of the liquid to cause the liquid to return to the retainer.

Figure 6:
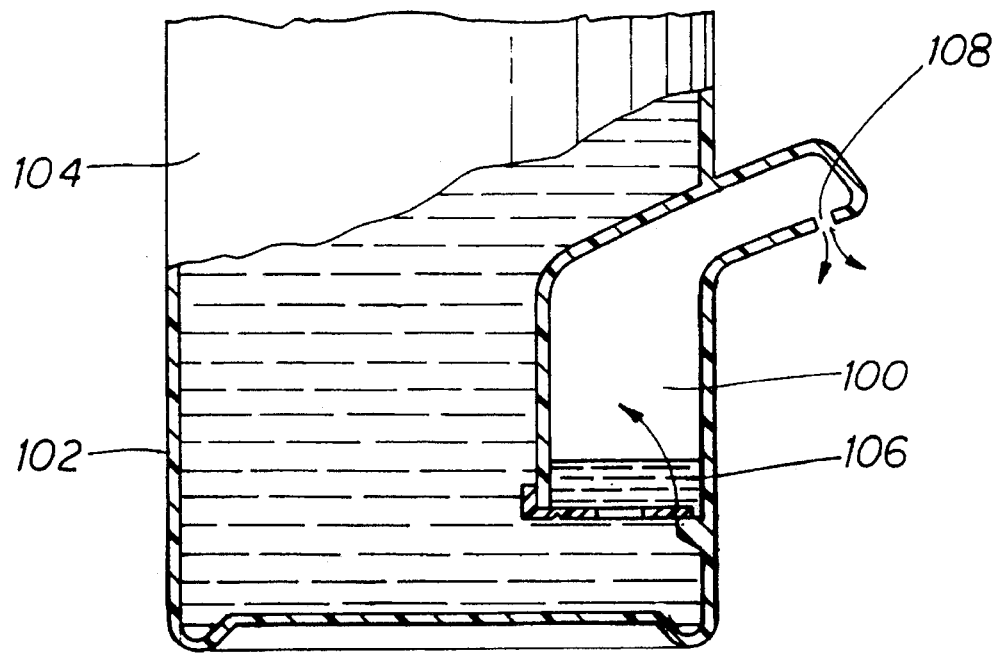

Yet another structure is shown in FIG. 6. In this instance, a reservoir 100 is formed in a wall 102 of a container 104. Again there is a pool of liquid at atmospheric pressure and in this case a pool 106 is in the reservoir 100 and open to atmosphere through a discharge opening 108.

The flow path of the structure shown in FIG. 6 is from the container 104, through the reservoir 100, and out via the discharge opening 108. The same operation is used in the FIG. 6 embodiment as is used in previous embodiments in that the container is deformed to change the balance of pressures in the dispenser and cause liquid to flow upwardly and out through the discharge opening 108. A flow controller 110 allows almost unrestricted outward flow and then moves to slow down flow during reverse flow.

It will be appreciated that numerous structures can be designed within the scope of the invention as claimed. In general the invention includes all dispenser structures which establish a first level of liquid below a zone of negative pressure and a second level at atmospheric pressure, and which can be caused to dispense by disturbing the balance in the dispenser. A flow controller is in the flow path to permit flow outwardly and to restrict reverse flow.

Figure 7:
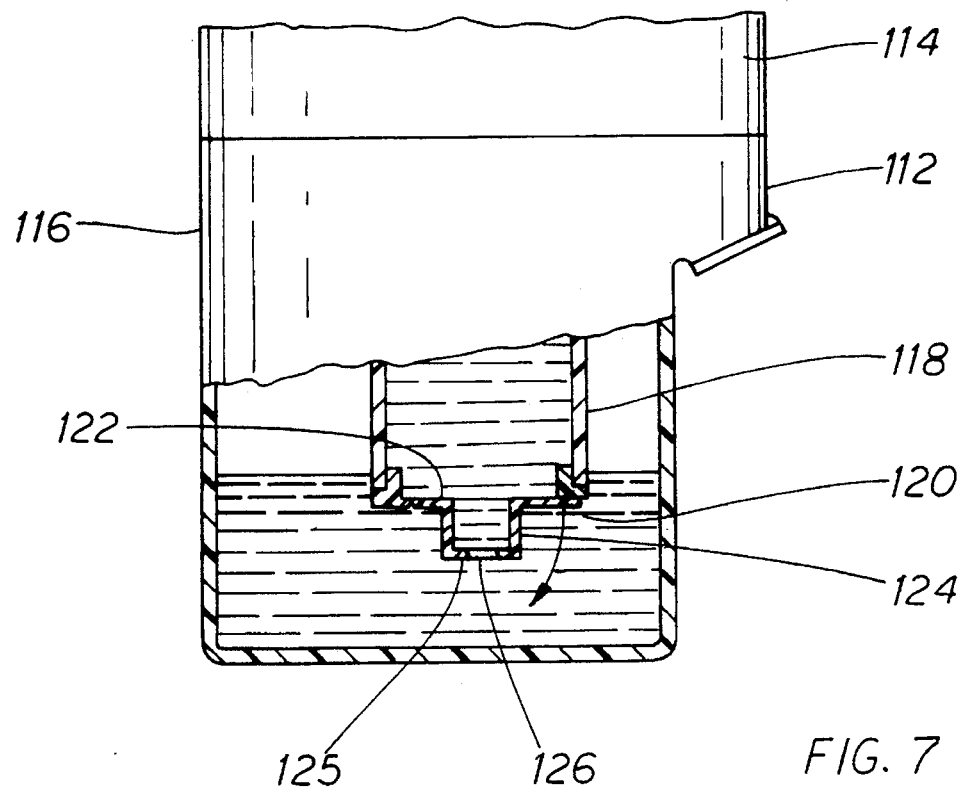
FIG. 7 is a view similar to FIG. 1 and illustrating a further embodiment of the invention.

Reference is next made to FIG. 7 to illustrate a further embodiment of the invention which may be preferable in some situations.

In the embodiments already described, the flap of the flow controller opens to release liquid at the level of the flap, and the opening in the flap which controls return flow is at this level also. Some liquids are not only viscous, but they also have a "stickiness" which results in build up on surfaces. Such liquids will tend to coat the inside walls of the reservoir 34, (FIG. 1) and neck 28. As a result the level in the reservoir will be slow to return to the level shown in FIG. 1. Consequently, after the flap closes, liquid may flow upwardly through flap opening 52 faster than the liquid falls off the walls. In this condition, air can pass through the opening to equalize the pressure before the liquid fails off the walls. The level will then slowly rise above the level shown in FIG. 1 reducing the volume available for temperature compensation. To reduce the risk of such a failure, the embodiment shows in FIG. 7 how it can be used.

As seen in FIG. 7, a dispenser 112 has a container 114 and reservoir 116. A neck 118 of the container has a flow controller 120 which differs from controller 30 (FIG. 1) in that a flap 122 includes a tubular downward projection 124 terminating in a floor 125 defining a flow return opening 126.

The operation of the structure shown in FIG. 7 differs from that in FIG. 1 because the dispensing flow takes place at one level and the return flow at a lower level.

When the dispenser 112 is actuated, the flap 122 will open and liquid will exit the container 114 and then rise through the reservoir (or other exit structure) before leaving the dispenser. This leaves the pool below the flap intact. Consequently, upon suck-back, the flap will close and liquid will be drawn from the level of opening 126. If the liquid level falls temporarily below the level of the flap, it will have no effect on the re-establishment of equilibrium which can be achieved only by drawing liquid through the openings. No air will be entrapped in this flow.

These and other embodiments are within the scope of the claims.

I claim:

1. A dispenser for liquids comprising:

a container for the liquid, the container having a bottom outlet;

a reservoir coupled to the container and containing the bottom outlet to maintain a pool of liquid about the outlet at a level above the outlet to thereby trap liquid in the container by establishing a negative pressure above the liquid in the container;

an outlet passageway leading from the reservoir to the outside of the container and including at least a portion of the outlet passageway above said outlet such that the liquid will not escape from the dispenser;

said bottom outlet, the reservoir and the outlet passageway being respective parts of a flow path along which liquid must pass to leave the dispenser;

the container including at least a portion which is resiliently deformable and operable to urge the flow of liquid outwardly along the flow path and upon release, to cause reverse flow inwardly after dispensing;

a flow controller positioned in the flow path and operable automatically in response to the direction of flow along the flow path to provide minimum resistance to flow as the liquid is urged to flow outwardly along the flow path and to provide a greater resistance to flow as the flow reverses and flows inwardly, whereby the inward flow is significantly slower than the outward flow to thereby control the rate of recovery of the dispenser so that the dispenser is not subjected to an unacceptable influx of air along with said inward flow.

2. A dispenser as claimed in claim 1 in which the container is a resilient bottle.

3. A dispenser as claimed in claim 1 in which the flow controller is a flap which is fully open to outward flow and partially open to inward flow.

4. A dispenser as claimed in claim 1 in which the flow controller is positioned in the bottom outlet of the container.

5. A dispenser as claimed in claim 3 in which the flow controller is positioned in the bottom outlet of the container.

6. A dispenser as claimed in claim 1 in which the flow controller is positioned in the outlet passageway.

7. A dispenser as claimed in claim 3 in which the flow controller is positioned in the outlet passageway.

8. A dispenser as claimed in claim 1 in which the flow controller is positioned in the reservoir.

9. A dispenser as claimed in claim 3 in which the flow controller is positioned in the reservoir.

10. A dispenser for liquids, the dispenser comprising:

a container having an outlet and extending upwardly from the outlet, the outlet being at a predetermined first level and at least a portion of the container being resiliently deformable for varying the pressure in the container to dispense liquid and, upon release, to cause reverse flow inwardly;

a reservoir having a bottom wall and coupled to the container above the outlet and containing the outlet near the bottom wall for receiving liquid from the outlet and forming a pool about said outlet to trap liquid in the container;

a discharge passageway coupled to the reservoir and extending upwardly from within the reservoir and terminating at a discharge opening;

the outlet of the container, the reservoir, and the discharge passageway providing a flow path along which liquid must flow to be dispensed; and a flow controller positioned in the flow path and operable automatically in response to the direction of flow along the flow path to provide minimum resistance to flow as the liquid is urged to flow outwardly along the flow path and to provide a greater resistance to flow as the flow reverses and flows inwardly after the liquid has been dispensed, whereby the flow controller reduces the rate of flow in the inward direction when compared with flow in the outward direction to thereby control the rate of recovery of the dispenser so that the dispenser is not subjected to an unacceptable influx of air along the flow path along with said inward flow.

11. A container for holding liquids at levels above a predetermined level and including pressure varying structure to vary the pressure in the container to cause dispensing and to cause reverse flow after dispensing; and a discharge assembly attached to the container, the discharge assembly including an outlet at a level above said predetermined level, a reservoir coupled to the container and in fluid communication with the container, and a flow controller positioned to provide minimum resistance to flow automatically in response to actuation of the pressure varying structure to cause the liquid to flow outwardly of the dispenser, and to provide a greater resistance to flow as the flow reverses after the pressure varying structure is released to cause inward flow, whereby the inward flow of liquid is significantly slower than the outward flow of liquid to thereby control the rate of recovery of the dispenser so that the dispenser is not subjected to an unacceptable influx of air along with the inward flow of liquid.

12. In a dispenser for liquid of the type having a container at least a portion of which is resiliently deformable and including an outlet, and outlet structure coupled to the container for retaining the liquid in the container such that there is a negative pressure in the container above the liquid, the improvement wherein said outlet structure comprises:

a temperature compensating reservoir extending upwardly above said outlet and coupled to the container, the reservoir being in liquid communication with the container, a flow controller operable automatically in response to flow out of the dispenser to provide minimum resistance to flow and to operate automatically in response to inward flow to provide an increased resistance to flow whereby the reverse flow is significantly slower than the outward flow to thereby control the rate of recovery of the dispenser so that the dispenser is not subjected to an unacceptable influx of air along with the inward flow of liquid.

13. A dispenser for liquids comprising:

a container for containing liquid with a negative pressure above the liquid, the container including dispensing structure and a bottom opening;

outlet structure including structure containing liquid at ambient air pressure to trap liquid in the container;

the dispensing structure being resiliently movable to cause liquid to flow out of the container, along a flow path and upon release, to flow inwardly;

a flow controller in the flow path and operable in response to liquid leaving the dispenser along the flow path to move the flow controller into a first condition in which the controller exhibits minimal resistance to flow, and operable in response to inward flow of liquid to move the controller into a second condition in which the controller exhibits maximum resistance to flow sufficient to slow the rate of flow of liquid to thereby control the rate of recovery of the dispensing structure after dispensing.

14. A dispenser for liquids, the dispenser comprising:

a main structure adapted to contain liquid at a first level and at a lower second level, there being a negative pressure above the first level and atmospheric pressure above the second level;

a discharge structure leading outwardly from said main structure;

the main structure and the discharge structure combining to define a flow path along which liquid flows outwardly during dispensing and inwardly during reverse flow after dispensing;

the main structure having at least a portion which is resiliently deformable to cause flow during dispensing and to cause reverse flow after dispensing; and a flow controller coupled to at least one of the main structure and the discharge structure and positioned in the flow path, the controller being operable automatically by outward liquid flow to present minimal resistance to flow outwardly and to present a greater resistance to flow during inward flow for resisting the rate of inward flow to thereby minimize the risk that air will tunnel through the liquid during inward flow.

15. A dispenser as claimed in claim 14 in which the flow controller includes a flap defining an opening and moveable between a first condition where the flap is deflected out of the outward flow and a second condition where the flap lies across the inward flow.

* * * * *